July 24, 1934. F. A. BULLINGTON 1,967,703
SEALING MEANS FOR ANNULAR CYLINDER ENGINES
Filed Oct. 13, 1930
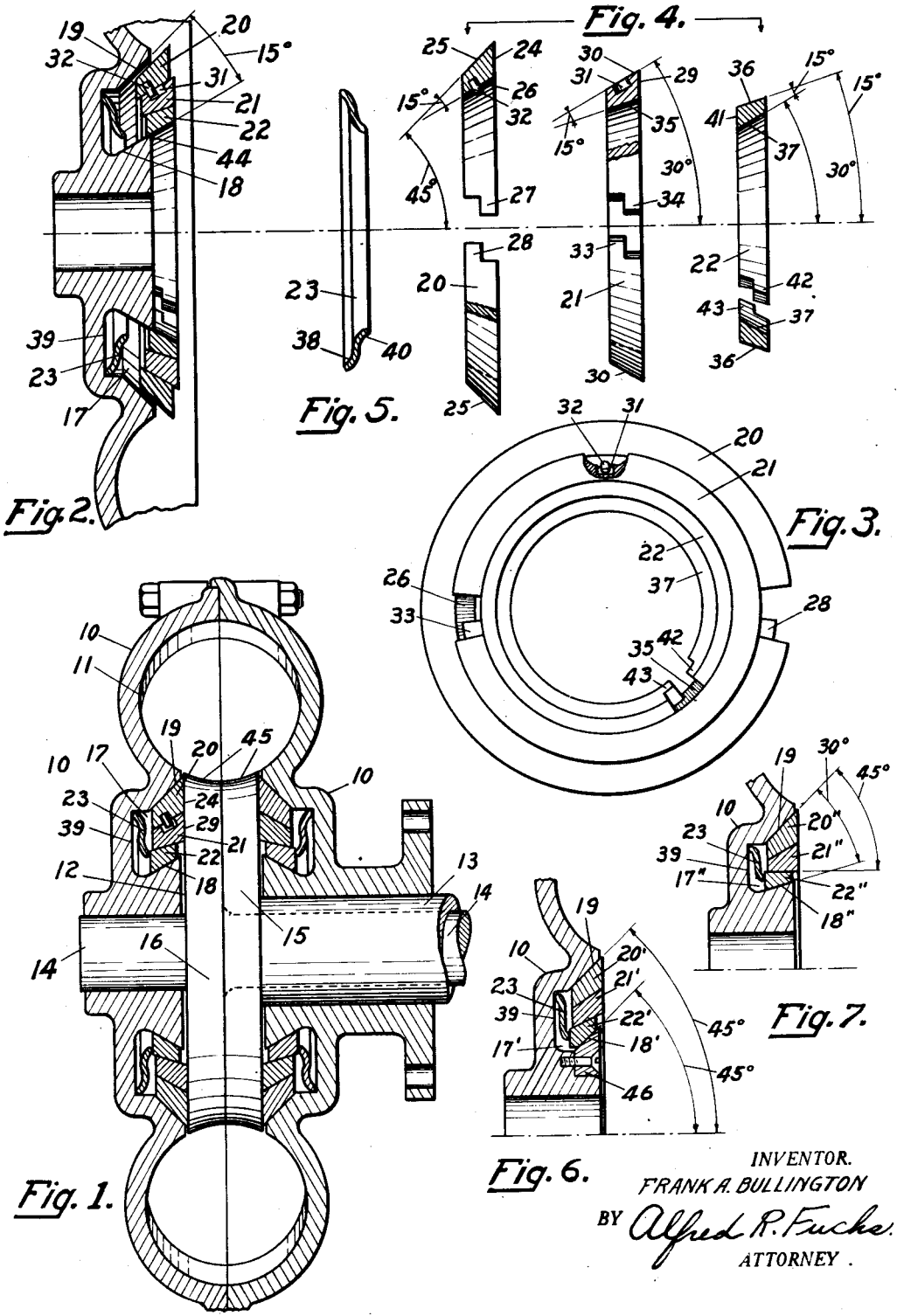
INVENTOR.
FRANK A. BULLINGTON
BY Alfred R. Fuchs
ATTORNEY.

Patented July 24, 1934

1,967,703

UNITED STATES PATENT OFFICE

1,967,703

SEALING MEANS FOR ANNULAR CYLINDER ENGINES

Frank A. Bullington, Kansas City, Mo., assignor to Bullington Motors, Kansas City, Mo., a common-law trust, consisting of the following members: Solomon Stoddard, Ernest E. Howard, and Frank A. Bullington Application October 13, 1930, Serial No. 488,300

23 Claims. (Cl. 286—7)

My invention relates to sealing means for annular cylinder engines, and more particularly to the sealing means in such an engine between the rotor and the casing in which the rotor operates, sealing means such as comprised in this invention being shown in my application Serial No. 158,617, filed January 3, 1927, patented October 14, 1930, Patent No. 1,778,182, of which this application is a continuation in part.

It is a purpose of my invention to provide sealing means for an annular cylinder engine that is provided with a radial slot or opening in the casing thereof in which a rotor or rotors are mounted to move, said sealing means being provided for engagement with the rotor or rotors adjacent the annular cylinder to prevent leakage from the cylinder. The slot or gap in the casing in which the rotor or rotors move must be of greater width than the thickness of the rotor or rotors to provide for mechanical and thermal clearance, or in other words, to allow for mechanical clearance and for the relative difference in thickness of the rotors and the width of the slot at a high temperature or at a low temperature, the amount of clearance necessary depending upon the proportionate differences in temperatures between the rotor and the stator or casing wall, and will vary on opposite sides of the rotor or rotors in accordance with the axial movement of the rotor due to vibration or distortion of either the rotor or the stator, or casing wall adjacent the rotor, and also due to mechanical forces or fluid pressure forces acting upon the rotor or the wall of the casing adjacent the same. It is a purpose of my invention to provide a sealing means that will permit such clearance as is necessary, and yet seal off the cylinder forming portion of the stator from the slot having the rotor or rotors operating therein.

It is also a purpose of my invention to provide sealing means that will hold the adjoining faces of the rotors, where a pair thereof are used, in contact at all times. It is desirable for purposes of sealing the gap between the pistons and the annular cylinder wall that the outer edge portions of the rotors be made with concave or arcuate outer surfaces conforming substantially to the radius of the annular cylinder, and when this is done the tendency for the rotors to separate under the high pressure existing in the cylinder will be increased materially, and the sealing means forming the subject matter of this invention is particularly designed to make the same particularly effective in accomplishing the purpose of keeping the adjoining surfaces of the rotors in contact at all times where the same are provided with a concave outer edge portion.

It is a further purpose of my invention to provide sealing means that is so constructed that the maximum of efficiency of operation of the annular cylinder engine is obtained, and which will have a maximum amount of durability and length of life, this being accomplished by providing a minimum of friction between the members of the sealing means and between the sealing means and the rotor or rotors that is possible and still obtain efficient sealing of the annular cylinder under conditions where positive or negative pressure exists.

It is particularly a purpose of my invention to provide a sealing means that has the capacity of being highly sensitive and rapidly adjustable within itself to produce a rapid movement of the components of said sealing means toward the annular cylinder and toward the rotor, and furthermore, of providing a yielding resistance of such magnitude to any forces tending toward movement of said sealing means in directions opposite to those referred to above as to maintain the seal and to prevent separation of the rotors from each other. Said sealing means comprises primarily a series of rings having conical annular faces, an annular groove having conical inner and outer walls provided in the side walls of the rotor slot in the casing of the annular cylinder engine, said casing being ordinarily referred to as the stator, and said slot receiving the series of rings referred to. The rings preferably comprise one or more sealing rings and a supporting ring, each ring having the inherent tendency to expand when confined in operative position due to the resilient nature thereof.

It is a further purpose of my invention to provide sealing rings of such a character that the same will be maintained in sealing contact with the casing or stator wall, the faces of the rotor, and with each other due to the inherent tendency thereof to expand when confined in operative position, and to provide a supporting ring of such a character that the same will be maintained in supporting contact with the sealing ring and the casing or stator by reason of its inherent tendency to expand while in operative position.

Furthermore, it is a purpose of my invention to provide resilient means acting to supply additional thrust force to said supporting ring, and through said supporting ring to the sealing rings to supplement the force exerted by the expansive force of the rings themselves under conditions of severe duty.

It is another object of my invention to provide the groove in the casing wall or stator with suitable inner and outer inclined surfaces to obtain an equal application of pressure of the outer sealing ring against the rotor and the said outer inclined wall portion, the preferred angle for this purpose being an angle of 45 degrees to the axis of rotation of the rotor. The inner wall of the annular groove may be either arranged parallel to or at an oblique angle to the outer wall, but is preferably arranged at a more acute angle so that the angle formed between the outer and inner annular walls of the groove is about 15 degrees, the purpose of this being to cause the sealing means as a unit to have a tendency to wedge outwardly toward the annular cylinder and laterally toward the rotor, this being particularly desirable in most cases, although, in the case of a light duty engine the parallel arrangement of the walls both at an angle of 45 degrees to the axis of rotation is desirable, as the resistance to movement inward away from the annular cylinder and toward the stator in a lateral direction is not so great, being only that caused by the resiliency of the rings and the wedging action thereof and the spring means associated therewith.

The shape of the sealing means taken as a unit may be varied to increase the resistance to movement away from the annular cylinder and toward the stator, and to increase the tendency of the sealing means as a whole to wedge laterally toward the rotor and toward the annular cylinder by increasing the inclination of the outer and inner annular walls of the groove relative to each other and the corresponding shape of the sealing means taken as a whole, one form of my invention contemplating a relatively great angle between said inner and outer annular walls of said groove to obtain a high resistance, and a relatively great wedging action or tendency to move toward the sealing surfaces on the rotor and the outer annular inclined wall of the groove.

It is a further purpose of my invention to provide a sealing means comprising rings that have leak proof joints with means for positively locating the joints of the sealing rings to maintain the same in staggered relationship, and to provide a supporting means that is also made with a leak-proof joint, which will cooperate with the sealing means to serve to seal the space in the groove in which said rings are located so that in the event of leakage of pressure into said space, said pressure will serve to assist the inherent expansive force of the rings to provide a more effective sealing contact between the sealing means and the rotor and the casing wall adjacent the rotor.

Other objects and advantages of my invention will appear as the description of the drawing proceeds. I desire to have it understood, however, that I do not intend to limit myself to the particular details shown or described except as defined in the claims.

In the drawing:

Fig. 1 is a central vertical sectional view through a portion of an annular cylinder engine, showing my improved sealing means in position therein.

Fig. 2 is a fragmentary sectional view, showing a portion of the stator or casing with the rings constituting my improved sealing means in the position that they would assume if mounted in the groove, but prior to being forced into their final operative position.

Fig. 3 is a side elevational view of the sealing means in assembled relation, the stator being omitted and the parts being substantially in the position shown in Fig. 2, and appear as viewed from the right of Fig. 2.

Fig. 4 is a view partly in elevation and partly in section of the rings of the sealing means separated.

Fig. 5 is a transverse sectional view of the auxiliary spring that is associated with the sealing means.

Fig. 6 is a fragmentary sectional view, showing a modified form of sealing means, and Fig. 7 is a view similar to Fig. 6 of a further modification.

Referring in detail to the drawing, in Fig. 1 is shown a portion of an engine comprising a casing 10, having an outer annular cylinder portion 11, and provided with a slot 12 extending radially from the axis of the shafts 13 and 14, which carry respectively the rotors 15 and 16 provided with suitable pistons that operate in the cylinder 11. The casing 10 is provided with an annular groove 17 on each side thereof adjacent the slot 12, and opening into said slot. Each annular groove is provided with an inner annular inclined wall portion 18, and an outer annular inclined wall portion 19, said inclined wall portions 18 and 19 being conical surfaces. The grooves 17 are provided for the reception of sealing means which engage the rotors 15 and 16 and the outer inclined wall portion 19 to seal the space between the walls of the slot 12 and said rotors, and prevent escape of pressure from the cylinder 11 into the space around the rotors.

In the arrangement shown in Figs. 1 to 5 inclusive, the outer inclined wall portion 19 extends substantially at an angle of 45 degrees to the axis of rotation of the rotors 15 and 16. The inner annular inclined wall portion 18 extends at a more acute angle to said axis, extending at an angle of substantially 30 degrees to said axis, or at an angle of 15 degrees to the outer annular wall portion 19. The sealing means shown in Figs. 1 to 5 inclusive, comprise a primary sealing ring 20, a secondary sealing ring 21, a supporting ring 22, and an auxiliary spring ring 23.

The ring 20 is provided with a plane face 24 that engages with the side face of the rotor 15 or 16 adjacent the same, and with an outer conical surface 25 extending at an angle of 45 degrees to the ring to conform to the surface of the outer annular inclined wall 19, and with the inner conical or inclined surface 26 extending at an angle of 15 degrees to the surface 25, or at an angle of 30 degrees to the axis of the ring. Said ring is preferably made of spring metal so as to have a resilient action, and is split, as will be evident from Figs. 3 and 4, the end portions of the ring at the gap being provided with reduced overlapping portions 27 and 28, which are in engagement with each other when the ring is in position in the groove 17 to provide a leak proof joint at the split in said ring.

The ring 21, which comprises a secondary sealing member, is provided with a flat or plane face 29, that engages with the side face of either the rotor 15 or 16 and with the conical or inclined outer surface 30, which conforms to the shape of the inner surface 26 of the ring 20, or which extends at an angle of 30 degrees to the axis of the ring 21. A recess 31 is provided in the ring 21 that is adapted to receive a pin or projection 32 on the ring 20, to maintain the rings 20 and 21 in the same relative position to each other as far as rotation is concerned, the pin 32 being smaller than the recess 31, so as to allow for a slight rotative movement of said rings relative to each other and permitting the necessary transverse or axial movement of said rings relative to each other.

The provision of the recess 31 and pin 32 is made so that the gap in the ring 21 will be staggered from the gap in the ring 20, as will be evident from Fig. 3, the reduced overlapping portions of the ring 21 being indicated by the numerals 33 and 34, and said gaps being located substantially diametrically opposite each other in the arrangement shown in Fig. 3. The inner conical surface 35 of the ring 21 is inclined at an angle of substantially 15 degrees to the outer conical surface of said ring, thus extending at an angle of substantially 15 degrees to the axis of the ring 21.

The supporting ring 22 is provided with an outer conical surface 36 that conforms to the inner surface 35 of the ring 21 extending at an angle of substantially 15 degrees to the axis of the ring 22. The inner conical surface 37 of the ring 22, however, extends at an angle of substantially 30 degrees to the axis of the ring 22, the ring 22 being thus wider on the face thereof away from the rotor than on the face thereof toward the rotor, in contradistinction to the ring 21. The surface 37 extends at an angle of 30 degrees to the axis of the ring or to the axis of rotation of the rotors to conform to the shape and inclination of the conical or inclined inner wall portion 18 of the groove 17. The spring ring 23 is shaped so as to provide a curved flange portion 38 engaging the bottom wall 39 of the groove 17, and an oppositely directed curved flange portion 40 engaging the rear face 41 of the supporting ring 22. The supporting ring 22 is also provided with reduced overlapping end portions 42 and 43 at the gap therein to provide a leak proof joint at said gap, thus reducing the possibility of the escape of pressure that might leak into the groove 17 from the cylinder 11, past said ring 22.

In the assembly of the device the sealing means is assembled by passing the ring 21 into the ring 20 and the ring 22 into the ring 21 so that said rings lie one within the other, before the same are passed into the groove 17. It is obvious that, due to the inclination of the surface 18, the inner annular edge of the groove at the corner 44 where the entrance to said groove is located, is of larger diameter than the remainder of the inner annular wall of the groove, the same decreasing in diameter laterally toward the bottom 39 of the groove. The spring member 23 is of such a diameter that the same will pass over said corner 44 without any difficulty, having an opening of greater diameter than the minimum diameter of the entrance to the groove 17. The various rings 20, 21 and 22, however, all comprise a unit that is slightly smaller at its inside diameter when in normal expanded condition that the minimum diameter of the groove at the corner 44, that is, the rings normally fit within each other in substantially the position shown in Fig. 2 while detached from the engine without being either contracted or expanded, but the inner ring 22 is so made that its minimum inside diameter under normal conditions is less than the minimum diameter of the groove at the corner 44, making it necessary to slightly expand the ring 22, and simultaneously the rings 20 and 21 to pass the rings into the groove into the position shown in Fig. 2, which position they will maintain until forced further into the groove during assembly of the device. The rings will thus remain assembled with the groove even though the rotors are not in engagement therewith, which is of distinct advantage in the assembly or disassembly of the engine, as it prevents accidental disengagement of the sealing means from the groove when disengagement is not desired.

When the rotors and the casing are assembled in operative position, the rings 20, 21 and 22 are forced into the position shown in Fig. 1, being contracted from their normal position and having an inherent tendency to expand, which tendency will cause the ring 20 to exert a pressure outwardly toward the cylinder 11, and laterally toward the rotor 15 or 16, as the case may be, as it tends to move outwardly along the outer inclined wall portion 19 of the groove. A pressure in a similar direction will be exerted by the ring 21 as it tends to move outwardly along the inclined inner wall portion 26 of the ring 20, and the ring 22 will have a similar tendency to exert a similar pressure due to the inclination of the engaging surfaces 35 and 36 on the rings 21 and 22 respectively. This tendency will exist in each ring independently of the others, due to the shape and expansion pressure thereof and also independently of any action that the spring ring 23 may exert on the supporting ring 22, and through said supporting ring on the rings 21 and 20.

In the form of the invention described above, the angle between the inner and outer inclined walls of the groove being 15 degrees, the rings are each shown as having an angle of 15 degrees formed between their inner and outer conical surfaces, the two sealing or rotor contacting rings forming an angle of 30 degrees, the remote sides thereof diverging in one direction, while the supporting wedge ring has its sides diverging at an angle of 15 degrees in the opposite direction, whereby the three rings when assembled together form a total angle between the extreme outer face of the outer ring and the extreme inner face of the inner ring of 15 degrees to correspond to the angle between the inner and outer inclined sides of the groove.

This angularity of the rings causes the entire group to have a tendency, due to their tendency to expand, to move toward the rotor and to resist movement away from the rotor. Furthermore, due to the shape of the individual wedge-like rings, the same will be highly sensitive and rapid acting in their movement radially outwardly and axially toward the rotor and relatively slow in their movement in the opposite direction, thus tending to keep in contact with the rotor and the outer inclined wall portion of the groove in the stator at all times. Furthermore, the tendency of the ring 22 will be, as it moves outwardly along the inclined surface 18, to exert a wedging action on the ring 21, forcing it outwardly and against the rotor adjacent the same. The ring 21 will act on the ring 20 to force it outwardly and against the rotor in a similar manner as it is moved by the action of the ring 22. The spring 23 when used, furthermore aids in such movement of the rings 22 and 21 and the ring 20, and also increases the resistance of the rings 20, 21 and 22 against movement in the opposite direction. As the width of the groove from the wall 18 to the wall 19 increases in a direction toward the rotor the tendency will be, upon movement of the member 22 in an outward direction and toward the rotor, for the outer rings 20 and 21 to immediately expand into engagement with the rotor and the wall 19 to increase the overall thickness of the rings in a radial direction to correspond to the size of the groove. It will be noted upon reference to Fig. 1 that the outer peripheral surface of the rotors 15 and 16, indicated by the numeral 45, is concave transversely, having the same curvature as the cylinder wall crosswise thereof, thus causing the pressure within the cylinder to have a greater tendency to cause separation of the rotor members 15 and 16, than would be the case if the same were cylindrical, and my improved sealing means serves to hold the rotor members 15 and 16 against separation due to such pressure.

In the form of the invention shown in Fig. 6, the inner wall 18' extends parallel to the outer wall 19 of the groove 17'. This form of the invention is more particularly suited for light duty application and the thrust spring 23 while used to supplement the action of the rings 20', 21' and 22' is not absolutely necessary, as the rings themselves have an inherent tendency to expand when in assembled position, as in the previously described form. In this form of the invention a ring 46 is provided that is detachable from the casing, and which is provided with the conical wall portion 18' forming the inner wall of the groove, said ring being detachable so as to make it easier to assemble the rings in the groove. In this form of the invention the spring 23 can be of smaller inside diameter than the outside diameter of the ring 46. The spring rings 23, however, in either the form shown in Figs. 1 to 5 and that shown in Fig. 6 have the advantage that in the event the sealing rings should lose their inherent resiliency, the same will maintain a high degree of sealing efficiency as long as the spring thrust ring remains operative.

In the form of the invention shown in Fig. 6, the sealing ring 20' has an outer surface of the same inclination as on the sealing ring 20. The supporting ring 22' has the inner conical surface thereof that contacts with the wall portion 18', extending at an angle of 45 degrees to the axis of the ring, while the outer surface thereof extends at an angle of less than 30 degrees to said axis, thus the inner conical surface of the ring 21' must and does extend at an angle of less than 30 degrees to the axis of said ring, and the outer conical surface of the ring 21' and the inner conical surface of the ring 20' extends at an angle of more than 30 degrees to the axis of said rings. The action of the rings 20', 21' and 22' due to their inherent tendency to expand and under the influence of the resilient member 23 is similar to that of the rings 20, 21 and 22, except that the entire set of sealing means has a reduced tendency to wedge outwardly and toward the rotor as a unit in the groove over that in the form shown in Figs. 1 to 5.

In Fig. 7 a form of the invention is illustrated, which is best adapted for operating conditions wherein an extremely high resistance force against movement away from the rotor is desired. This resistance results from the greater angularity of the inner and outer walls of the groove in the stator relative to each other. In Fig. 7 the groove 17″ is shown with its inner wall 18″ extending at an angle of substantially 15 degrees to the axis of the groove, and with its outer wall 19 extending at an angle of 45 degrees to said axis, as in the previously described forms. The angle between the conical annular inner wall portion 18″ and the conical annular outer wall portion 19 is thus 30 degrees, whereas, the angularity between the walls 18 and 19 is only 15 degrees, thus materially increasing the wedging action of the sealing means as a unit causing the same to tend to move toward the rotor more readily than in the form shown in Fig. 1, and resist movement away from the rotor to a much greater degree. The supporting ring 22″ has its inner annular face inclined at the same angle as that of the wall 18″, and has the outer face thereof made cylindrical. The outer conical face of the sealing ring 20″ extends at an angle of 45 degrees to the axis of said ring, the inner face thereof extending substantially at an angle of 30 degrees to said axis while the secondary sealing ring 21″ has its outer annular face conforming to the inclination of the inner face of the ring 20″ and its inner annular face cylindrical. As the outer surface of the supporting ring 22″ is cylindrical, obviously the inner conical surface of this ring cannot be held in contact with the wall 18″ of the groove without the use of the spring 23, which is essential in this form of the invention in order to hold the ring 22″ in supporting position.

Having thus described my invention, what I claim is:—

1. In a machine of the character described, a casing, a rotatable member mounted in said casing, said casing having an annular groove therein, and composite sealing means mounted in said groove and engaging said rotatable member, said groove having an inclined outer wall and an inclined inner wall simultaneously engaged by said sealing means, said rotatable member and said sealing means having plane engaging faces.

2. In a machine of the character described, a casing, a rotatable member mounted in said casing, said casing having an annular groove therein, and sealing means mounted in said groove and engaging said rotatable member, said groove having an inclined outer wall and an inclined inner wall engaged by said sealing means, the outer and inner walls of said groove being inclined to the axis of said groove in the same direction.

3. In a machine of the character described, a casing, a rotatable member mounted in said casing, said casing having an annular groove therein, and sealing means mounted in said groove and engaging said rotatable member, said groove having an outer wall and an inner wall both inclined to the axis of said groove in the same direction and engaged by said sealing means, said inner wall being inclined at an angle to the axis of said rotor that is more acute than the angle of inclination of said outer wall to said axis.

4. In a machine of the character described, a casing, a rotatable member mounted in said casing, said casing having an annular groove therein having converging inner and outer walls, and sealing means mounted in said groove and engaging said rotatable member, said groove having an outer wall and an inner wall both inclined to the axis of said groove in the same direction.

5. In a machine of the character described, a casing, a rotatable member mounted in said casing, said casing having an annular groove therein, and sealing means mounted in said groove and engaging said rotatable member, said groove having an inclined outer wall and an inclined inner wall engaged by said sealing means, said inner and outer walls being substantially parallel to each other.

6. In a machine of the character described, a casing, a rotatable member mounted in said casing, said casing having an annular groove therein, and sealing means mounted in said groove and engaging said rotatable member, said groove having an inclined outer wall and an inclined inner wall engaged by said sealing means, said sealing means comprising a sealing ring and a supporting ring.

7. In a machine of the character described, a casing, a rotatable member mounted in said casing, said casing having an annular groove therein, and sealing means mounted in said groove and engaging said rotatable member, said groove having an inclined outer wall and an inclined inner wall engaged by said sealing means, said inner wall being inclined at an angle to the axis of said groove that is more acute than the angle of inclination of said outer wall to said axis, said sealing means comprising a sealing ring and a supporting ring.

8. In a machine of the character described, a casing, a rotatable member mounted in said casing, said casing having an annular groove therein, and sealing means mounted in said groove and engaging said rotatable member, said groove having an inclined outer wall and an inclined inner wall engaged by said sealing means, said inner wall being inclined at an angle to the axis of said groove that is more acute than the angle of inclination of said outer wall to said axis, said sealing means comprising a sealing ring and a supporting ring, said sealing ring engaging said outer wall and said supporting ring engaging said inner wall.

9. In a device of the character described, a member, having an annular groove therein and sealing means mounted in said groove comprising a plurality of rings having wedging surfaces inclined toward the axis of said groove, each of said rings having a plurality of such inclined wedging surfaces inclined toward said axis in the same direction.

10. In a device of the character described, a member, having an annular groove therein and sealing means mounted in said groove comprising a plurality of interfitting rings, each having annular inner and outer surfaces extending at an acute angle to each other and to their common axis in the same direction.

11. In a device of the character described, a member, having a groove therein provided with an outer annular inclined wall and an inner annular inclined wall, and sealing means in said groove comprising a sealing ring having an annular inclined surface engaging said outer inclined wall and a supporting ring having an annular inclined surface engaging said inner inclined wall.

12. In a device of the character described, a member, having a groove therein provided with an outer annular inclined wall and an inner annular inclined wall, and sealing means in said grove comprising a sealing ring having an annular inclined surface engaging said outer inclined wall and a supporting ring having an annular inclined surface engaging said inner inclined wall, said rings having inclined surfaces opposite said wall engaging surfaces extending at an acute angle to said wall engaging surfaces.

13. In a machine of the character described, a casing, a rotatable member mounted in said casing, said casing having an annular groove therein, and sealing means mounted in said groove and engaging said rotatable member, said groove having an inclined outer wall and an inclined inner wall engaged by said sealing means, said sealing means comprising a sealing ring, a supporting ring and resilient means engaging said supporting ring and tending to move said supporting ring laterally and outwardly along said inclined inner wall.

14. In a machine of the character described, a casing, a rotatable member mounted in said casing, said casing having an annular groove therein, and sealing means mounted in said groove and engaging said rotatable member, said groove having an inclined outer wall and an inclined inner wall engaged by said sealing means, said sealing means comprising a primary sealing ring, a secondary sealing ring and a supporting ring.

15. In a machine of the character described, a casing, a rotatable member mounted in said casing, said casing having an annular groove therein, and sealing means mounted in said groove and engaging said rotatable member, said groove having an inclined outer wall and an inclined inner wall engaged by said sealing means, said sealing means comprising a primary sealing ring, a secondary sealing ring and a supporting ring, all said rings having inner and outer annular faces extending at an acute angle to each other.

16. In a machine of the character described, a casing, a rotatable member mounted in said casing, said casing having an annular groove therein, and sealing means mounted in said groove and engaging said rotatable member, said groove having an inclined outer wall and an inclined inner wall engaged by said sealing means, said sealing means comprising a primary sealing ring, a secondary sealing ring and a supporting ring, all said rings having inner and outer annular faces extending at an acute angle to each other, the engaging faces of said secondary sealing ring and said supporting ring being cylindrical.

17. In a machine of the character described, a casing, a rotatable member mounted in said casing, said casing having an annular groove therein, and sealing means mounted in said groove and engaging said rotatable member, said groove having an inclined outer wall and an inclined inner wall engaged by said sealing means, said rotor and said sealing means having plane engaging faces, said sealing means comprising a plurality of rings having wedging surfaces engaging said inclined walls and wedging surfaces engaging adjoining rings, said rings being mounted in said groove under tension so as to have an inherent tendency to move toward said rotatable member and outwardly.

18. In a machine of the character described, a casing, a rotatable member mounted in said casing, said casing having an annular groove therein, and sealing means mounted in said groove and engaging said rotatable member, said groove having an inclined outer wall and an inclined inner wall engaged by said sealing means, said sealing means comprising a primary sealing ring, a secondary sealing ring, each of said sealing rings having leak-proof joints, and means for maintaining the joints of said sealing rings in staggered relation to each other.

19. In a machine of the character described, a casing, a rotatable member mounted in said casing, said casing having an annular groove therein, and sealing means mounted in said groove and engaging said rotatable member, said groove having an inclined outer wall and an inclined inner wall engaged by said sealing means, said sealing means comprising a primary sealing ring, a secondary sealing ring and a supporting ring, all said rings having inner and outer annular faces inclined to the axes of said rings in the same direction.

20. In a machine of the character described, a casing, a rotatable member mounted in said casing, said casing having an annular groove therein having converging inner and outer walls, and sealing means mounted in said groove and engaging said rotatable member, said groove having an inclined outer wall and an inclined inner wall engaged by said sealing means, said sealing means comprising a primary sealing ring, a secondary sealing ring and a supporting ring, all said rings having inner and outer annular faces inclined to the axes of said rings in the same direction.

21. In a machine of the character described, a casing, a rotatable member mounted in said casing, said casing having an annular groove therein, and sealing means mounted in said groove and engaging said rotatable member, said groove having an inclined outer wall and an inclined inner wall engaged by said sealing means, said inner and outer walls being substantially parallel to each other, said casing having a detachable portion forming a wall of said groove.

22. In a device of the character described, a member having a groove therein provided with an outer annular inclined wall and an inner annular inclined wall, and sealing means in said groove comprising a sealing ring having an annular inclined surface engaging said outer inclined wall and a supporting ring having an annular inclined surface engaging said inner inclined wall, said rings having annular surfaces opposite said wall engaging surfaces extending at an acute angle to said wall engaging surfaces.

23. In a machine of the character described, a casing, a rotatable member mounted in said casing, said casing having an annular groove therein, and a sealing device mounted in said groove, comprising wedge-shaped sealing means engaging said rotatable member, wedge-shaped supporting means engaging said sealing means, and means tending to urge said supporting means laterally toward said rotatable member and outwardly toward said sealing means, the taper of the means comprising said sealing device being of such acuteness that said sealing device has the inherent tendency to effect frictional gripping action resisting movement thereof in one direction and having friction releasing action in the opposite direction,

FRANK A. BULLINGTON.